April 23, 1929.  L. W. BONNEY  1,710,671
AEROPLANE CONTROL
Filed Nov. 21, 1925   3 Sheets-Sheet 1
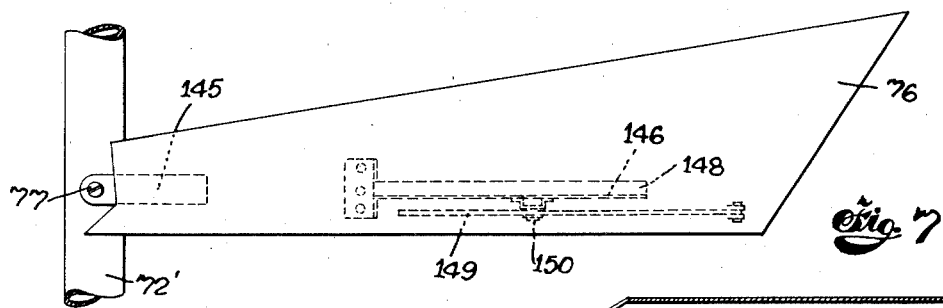
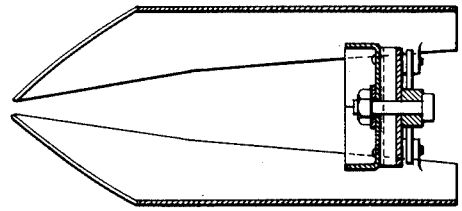
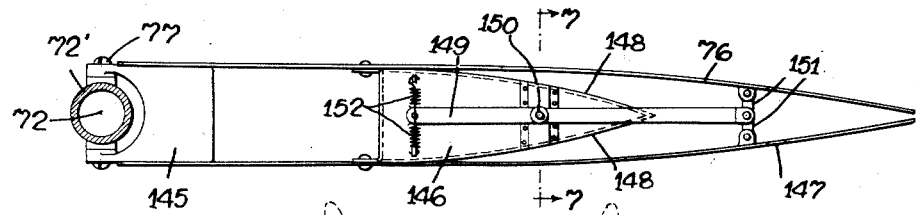
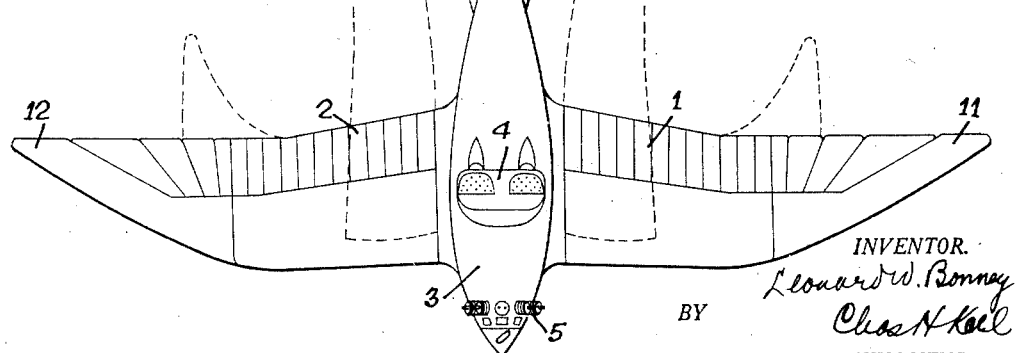
INVENTOR.
Leonard W. Bonney
BY Chas N Keil
ATTORNEYS.

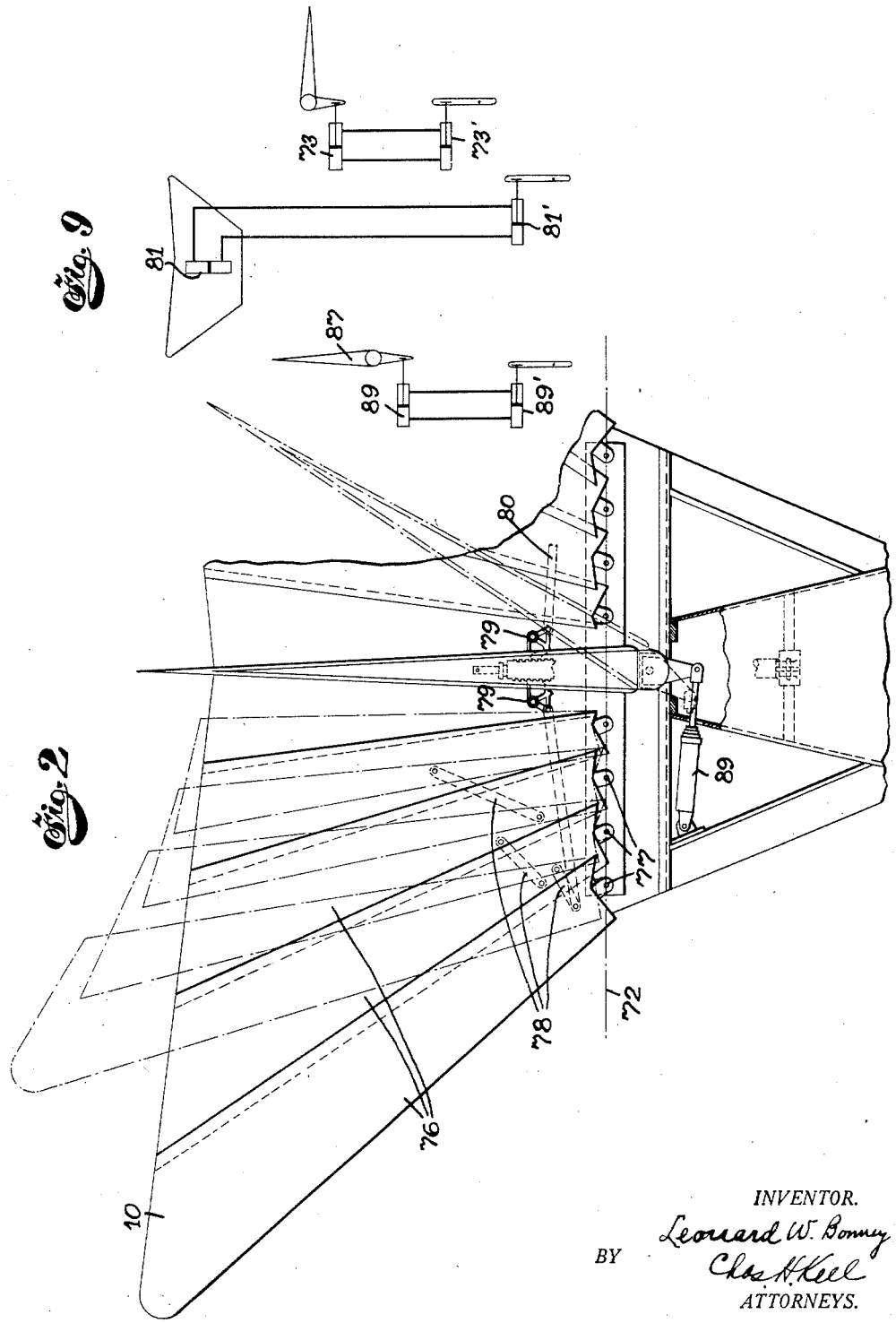

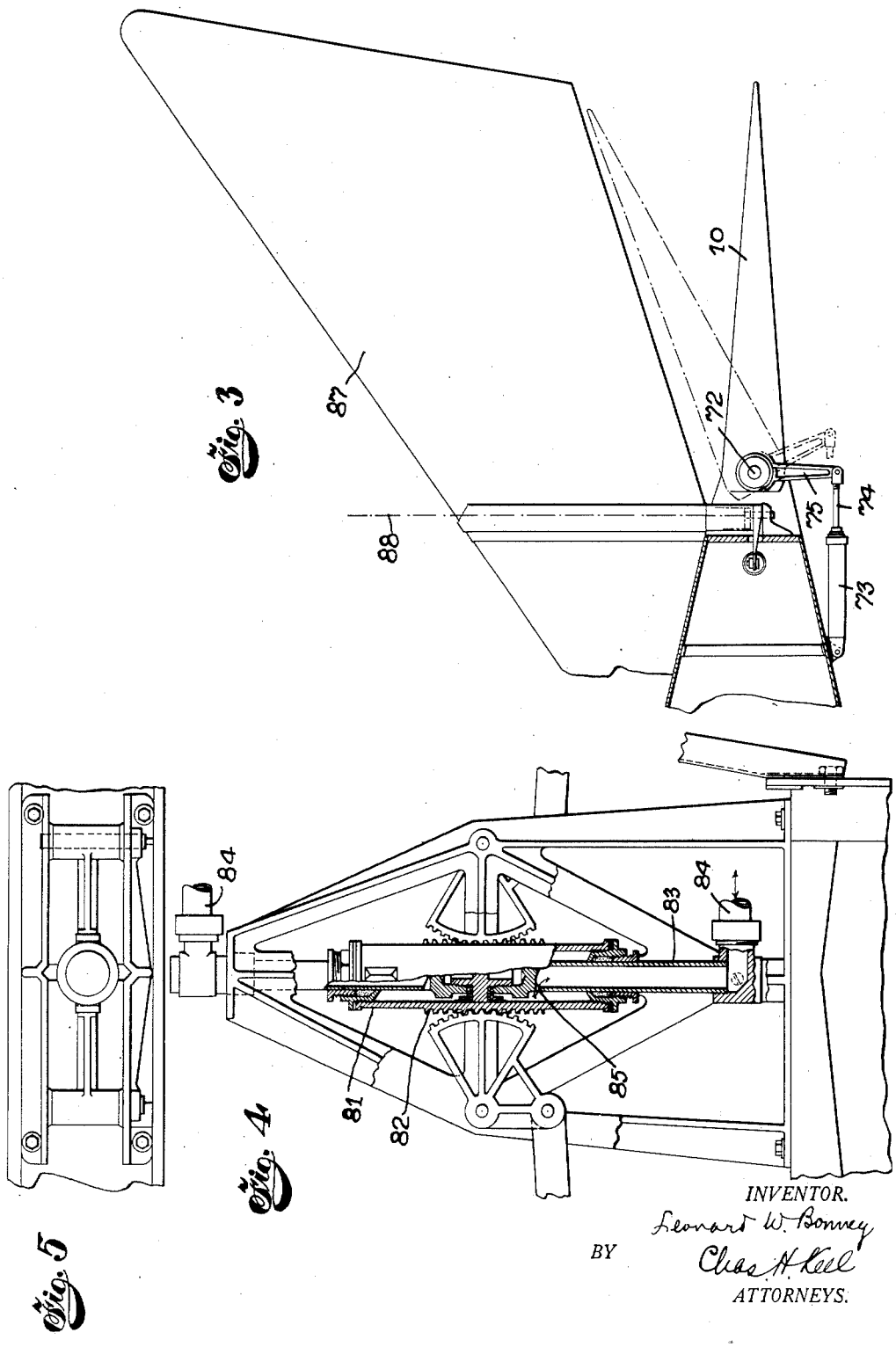

Patented Apr. 23, 1929.

1,710,671

UNITED STATES PATENT OFFICE.

LEONARD W. BONNEY, OF FLUSHING, NEW YORK; FLORA MacDONALD BONNEY EXECUTRIX OF SAID LEONARD W. BONNEY, DECEASED.

AEROPLANE CONTROL.

Application filed November 21, 1925. Serial No. 70,473.

This invention relates to aeroplanes and particularly to control elements therefor including a novel elevator and tail unit.

The object of the invention generally is a novel and improved form of horizontal tail or elevator unit for aeroplanes whereby the longitudinal control and stability of the craft are effected in a more reliable and efficient manner than has hitherto been possible and particularly an elevator whose effective surface is variable, together with its angle of incidence, at the will of the operator. A further object of the invention is an aerofoil control surface possessing inherent or automatic flexibility, contributing to the ease and smoothness of control of the craft. My invention also includes such an elevator or horizontal tail surface combined with a rudder for effecting the combined control movements thereof and an operating system and mechanism therefor by means of which the actuation of the controls is effected in a particularly efficient, reliable and effective manner.

For a better understanding of the above indicated novel features of my invention and others which will hereinafter appear, reference may be had to the accompanying drawings forming a part of this application, wherein:

Fig. 1 is a plan view of an aeroplane embodying my invention,

Fig. 2 is a plan view of the tail unit therefor,

Fig. 3 is a side view of the tail unit,

Fig. 4 is a plan view of the main carrying frame for the elevator,

Fig. 5 is an end view thereof,

Fig. 6 is a sectional view along the line 6—6 of Fig. 2,

Fig. 7 is a section along the line 7—7 of Fig. 6,

Fig. 8 is an enlarged plan view of one of the feathers 76 and

Fig. 9 is a diagrammatic view of a system of control for the tail unit.

Refering to the drawings where similar reference numerals designate similar parts throughout, I have illustrated my invention as embodied in an aeroplane of the monoplane type including the left and right hand wing sections 1 and 2 carrying a central main body 3. The latter contains at any suitable point a cockpit 4 for the pilot and passengers and carries at the front end any suitable motor 5. The aeroplane herein exhibited includes a special tail unit including a flexible variable tail surface elevator 10 and flexible variable surface wing tips 11 and 12, these tips being differentially variable for assisting in effecting the lateral stability control and also variable in the same direction for the purpose of varying the effective lifting surface of the plane. The elevator surface 10 is also variable to increase and decrease its surface in addition to its regular elevator control action, and the tail unit including the elevator surface 10 is mounted on the rear end of the fuselage 3. The elevator 10 is mounted for pivotal movements about a horizontal axis 72 and may be operated in any suitable manner, preferably by the hydraulic cylinder 73 having its piston rod 74 pivotally attached to a bell crank lever 75 fixed in any suitable manner to the elevator, one end of the hydraulic cylinder 73 being pivotally attached in any suitable manner to the fuselage or frame work. The elevator 10 includes a multiplicity of feather or fan blade-like members 76 (diagrammatically illustrated) which are pivotally attached to the elevator support at the points 77 for adjustable movements in planes parallel with the axis 72. The feather or blade members 76 may be extended as illustrated in full lines, to increase the horizontal tail surface and elevator control, or may be closed up, somewhat similar to a fan, to the position indicated in dotted lines. They are connected together by a system of pivoted link connections 78 to provide a simultaneous shutting and opening movement thereof, the arrangement being such that the feather-like members 76 have an increasingly larger movement from the innermost to the outermost feathers. The actuation of these feathers may be effected in any suitable manner and in the particular embodiment shown I have indicated generally a pair of segmental gears 79 with link connections 80 pivotally connected to these gears at one end, and to the outermost featherlike member 76 at the other ends. The segmental gears 79 mesh with racks carried by a cylinder 81, the latter being carried by a fixed piston 82 and fixed hollow piston rod 83, whereby upon admission of hydraulic operating fluid to either side of the piston 82 and the simultaneous withdrawal from the other side, the cylinder 81 with the racks engaging the segmental gears may be moved back and forth to control the closing and opening of the fan-like feather members 76. Preferably the feather members 76 are of flexible character to give and yield in response to the controlling movements so as to smooth out the longitudinal control. Such flexibility may be secured by making them of a metal or other material having the required flexibility and resiliency or the flexibilty of the feathers may be increased by a special construction, such for example as that diagrammatically indicated in Fig. 6, hereinafter described. At 87 I have indicated generally a rudder pivotally mounted on a vertical axis 88 for movements thereabout for effecting the usual controlling and steering movements in cooperation with the other controls. This rudder may be also hydraulically controlled as for example by the cylinder 89 having its piston rod suitably connected with the rudder to effect movements. The rudder 87 may also be of the flexible construction indicated for the elevator. In Fig. 9 I have illustrated diagrammatically the various controls for the tail unit wherein the hydraulic cylinders 73, 81 and 89 are controlled respectively by the manual control cylinders 73', 81' and 89', suitable hand control levers being connected with the latter cylinders and suitable communicating connections being disposed between the cylinders.

By means of the tail unit shown, not only may it be operated about its horizontal axis to effect the levelling out of the plane when approaching the point of landing, but also the effective controlling and tail surface is capable of being enlarged to a substantial extent in conjunction with the above indicated variation of the wing tips 11 and 12.

The particular construction of the tail 10 permitting the closing and opening of the feather-like members thereof is illustrated more or less diagrammatically in Figs. 6–8, these illustrations also indicating the flexible construction and character thereof. In Fig. 6 I have indicated more or less diagrammatically a sectional view along the line 9—9 of Fig. 2 illustrating the flexible or yielding character of the tail unit. Each of the tail members 76 includes a U-shaped bracket 145 which is pivotally connected to the tubular shaft 72' at the points of 77 for reefing adjustments in a plane parallel to the axis 72 of the tube 72'. Each of the brackets 145 carries a tapered web-like member 146 and the rear portion of the feather 76 is in the form of a tapered shell-like trailing edge 147 which is adjustable up and down in the manner indicated by the dotted lines in Fig. 6.

The upper and lower edges 148 of the web-like member 146 form bearing surfaces and stops for the shell-like portion 147 in the lowermost and uppermost positions respectively. The flexible trailing portion 147 is normally maintained in its neutral position with reference to the main body of the feather by means of a mechanism including a lever 149 pivoted on the side of the web-like member 146 at the point 150 for adjustments in vertical planes, one end of this lever being connected to the shell-like portion 147 by means of the pivoted links 151, and the rear end is connected to the relatively fixed part of the feather, as for example to the web 146, by means of the springs 152. These springs are so adjusted as to normally hold the lever 149 and the connected flexible trailing portion in the full line position indicated, but upon the increase of pressure either upon the lower or upper surface thereof, yield to permit the flexing of the trailing edge 147, thereby cushioning and smoothing out the longitudinal control. These flexible mechanisms including the web-like supporting structures 146 and the spring mechanisms are in positions to permit the lateral telescoping of the tail feathers upon each other when they are closed and opened, as indicated.

Having thus described my invention, what I claim and desire to protect by Letters Patent is:

1. An elevator element for aircraft including a plurality of pivoted and telescopically arranged fan or blade-like members together with connections therebetween causing the simultaneous closing and opening movements thereof, a pivotal mounting for said elevator whereby said elevator element may be moved upward and downward for effecting the longitudinal control movements, and additional means whereby the fan or blade-like members may be reefed or opened at the will of the operator without interfering with the elevator control.

2. A tail unit for aeroplanes including an elevator of the character set forth in claim 1 and a rudder together with a hydraulic mechanism including closed hydraulic circuits for effecting the movements of said elements respectively.

3. An elevator control element of the character set forth in claim 1 wherein the interconnections between the fan blade members are such as to effect varying degrees of movements from one side to the other of the element.

In testimony whereof, I have signed my name to this specification.

LEONARD W. BONNEY.